June 24, 1930.  J. M. ANDRE  1,768,093
COMBINATION MOLD AND TRIMMER FOR RUBBER HEELS,
SOLES, AND ALL MECHANICAL MOLDED RUBBER GOODS
Filed Dec. 28, 1925  2 Sheets-Sheet 2
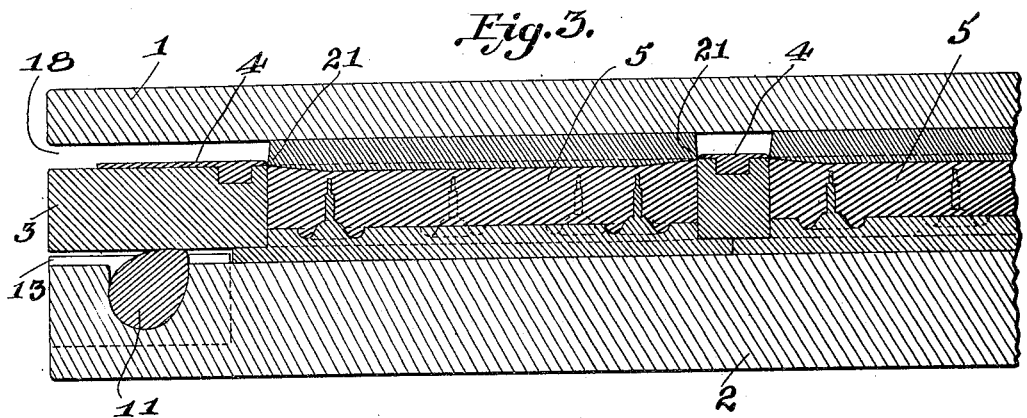
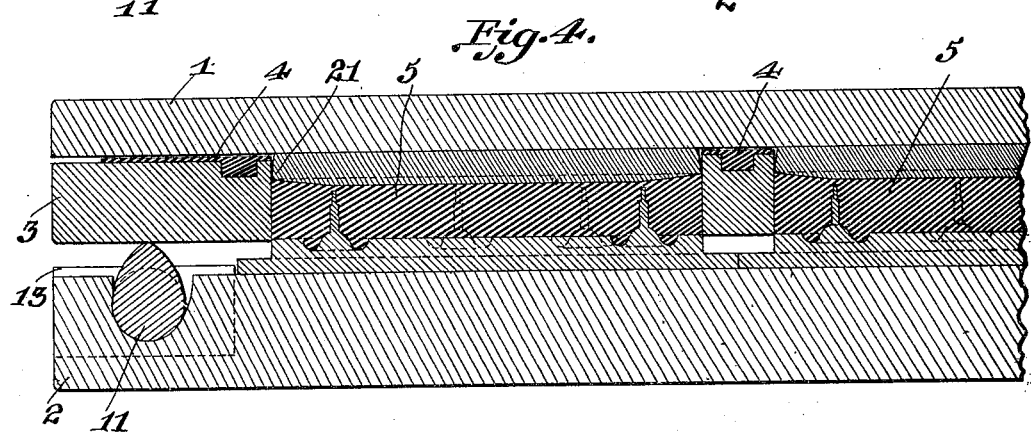
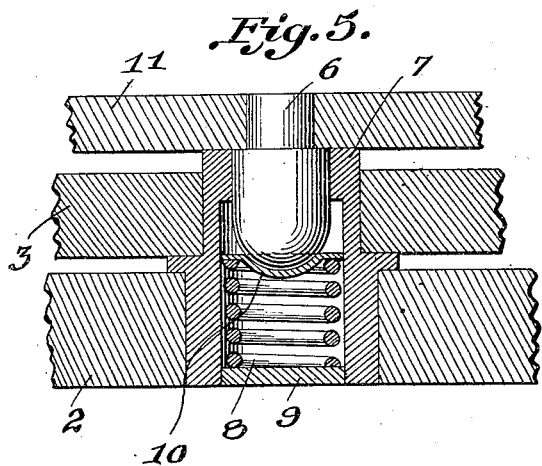
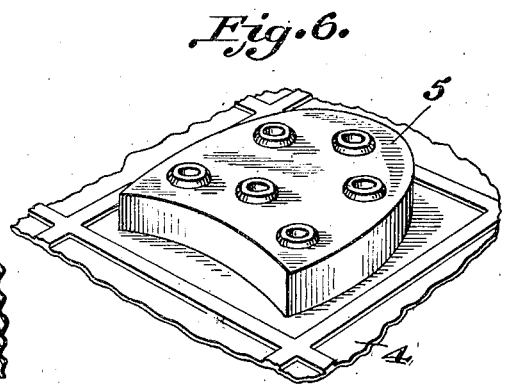
Inventor
Joseph M. Andre
By Mason Fenwick Lawrence
Attorneys Patented June 24, 1930

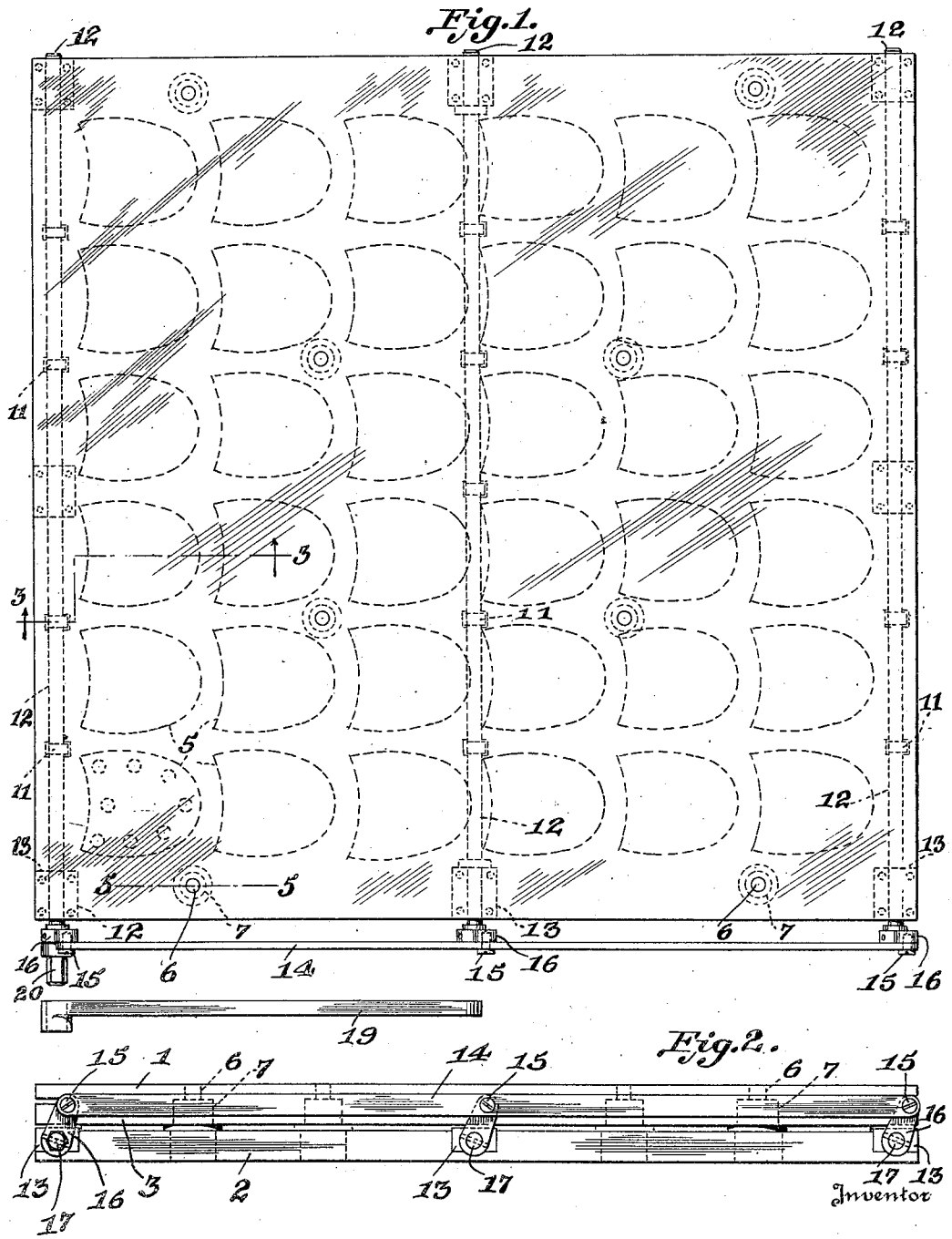

1,768,093

UNITED STATES PATENT OFFICE

JOSEPH M. ANDRE, OF MONTELLO, MASSACHUSETTS

COMBINATION MOLD AND TRIMMER FOR RUBBER HEELS, SOLES, AND ALL MECHANICAL MOLDED RUBBER GOODS

Application filed December 28, 1925. Serial No. 77,978.

This invention relates to improvements in a combination mold and trimming devices, particularly in means for trimming excess rubber from rubber heels, soles and all mechanical molded rubber goods of the type illustrated and described in my copending application, Serial No. 149,653, filed November 20, 1926.

An object of this invention is to provide a mold and trimmer for articles such as rubber heels, soles and miscellaneous molded rubber goods, having an upper and lower plate, a movable cavity plate or cavity therebetween, clearance between the upper and lower plate being sufficient to allow suitable movement of the movable cavity plate or cavity and a cutting edge connected with the upper plate, and means for moving the movable cavity plate or cavity beyond the cutting edge.

Further objects of this invention will appear from the following detailed description of the device and from disclosures in the two sheets of drawings which are herewith made a part of this application.

In the drawings,

Fig. 1 represents a plan view of the heel mold in assembled form disclosing the cam lever in relationship thereto.

Fig. 2 illustrates the end elevational view of Fig. 1, showing the cam tie rod and the cam levers in relationship to the mold.

Fig. 3 illustrates a sectional view of Fig. 1 taken along line 3—3 showing a heel within the mold just previous to the process of trimming the excess material from the heel.

Fig. 4 represents a view of Fig. 3, disclosing a heel within the mold after the process of trimming the excess material has been completed by means of forcing the movable plate upward toward the rand plate.

Fig. 5 illustrates a sectional view of Fig. 1 taken along line 5—5.

Fig. 6 is a perspective view of a heel as removed from the mold previous to trimming the excess material from the heel by means of this invention.

Numeral 1 designates a rand plate suitable for use in heel molds; particularly adapted for molding rubber heels, while numeral 2 designates a name plate as desired, ordinarily used in heel molds or the like. Between the rand plate 1 and the name plate 2 is positioned a movable plate 3, the movable plate 3 being of a thickness to allow sufficient adjustability between plates 1 and 2 so as to properly separate or trim the excess material 4 from the heel 5 on the operation of the device.

Numeral 6 designates a rand plate locating pin adapted to be suitably held in removable relationship to the device by means of a locating bushing 7, the lower ends of the rand plate locating pin 6 being adapted to be yieldingly supported by means of a locating bushing spring 8 and a locating bushing spring plug 9. Obviously, when the pressure on the top plate 1 is relieved, the spring 8 under compression will materially aid in separating the plates, the locating bushing spring cap being designated by the numeral 10. Plate 3 is adapted to be raised by means of a cam 11, suitably located and keyed to a cam shaft 12 carried in a cam shaft bearing 13, positioned preferably in the name plate 2. Ordinarily, a multiplicity of cams 11 will be required suitably connected together by means of a cam tie rod 14, pivoted by means of cam tie rod studs 15, or otherwise to cam levers 16, the cam levers 16 being connected to the cam shaft 12 by means of cam shaft nuts 17.

In operation this invention provides a combination heel mold and trimmer, the heel material 5 being properly located within the mold in the usual manner and the plates 1, 2, and 3 being suitably positioned previous to being placed under pressure. During the molding process excess material from the heel portion will tend to spread exteriorally from the upper edge of the heel as clearly disclosed in the perspective view in Fig. 6 and designated by numeral 4, the excess material previous to trimming will tend to accumulate in the spaces 18 as clearly disclosed in Fig. 3. When it is desired to operate the trimming plate 3, the hand lever 19 is placed in interlocking relationship with the cam shaft 12 as at 20, and operated in such a manner that the cam 11 will tend to move the plate 3 upward thereby forcing the excess material 4 above the cutting edge 21 of the rand plate 1, which will result in a clean and efficient separation of the excess material 4 from the main heel portion 5.

What I claim is:

1. A combination mold and trimmer having an upper and lower plate, a movable plate therebetween and having a molding aperture therethrough, clearance between the upper and lower plate being sufficient to allow suitable movement of the movable plate, a cutting edge connected with the upper plate and adapted to fit slidably in said aperture, means rotatably mounted in the lower plate and engaging the bottom of the movable plate for moving the movable plate to cause the cutting edge to enter said aperture.

2. The combination in a mold and trimmer of an upper plate and a lower plate, of a movable plate therebetween, means between said upper and lower plates for grinding said movable plate rectilinearly from one plate to the other, of a cutting edge connected with the upper plate, and of means rotatably mounted in the lower plate and engaging the bottom of the movable plate for moving the movable plate on said grinding means past the cutting edge.

3. In a mold and trimmer, an upper and lower plate, a movable plate therebetween provided with suitable mold openings, clearance between the upper and lower plate being sufficient to allow suitable movement of the movable plate, a cutting edge connected with the upper plate, means rotatably mounted in the lower plate and in contact with the bottom of the movable plate for moving the movable plate beyond the cutting edge, and means for operating the last named means.

4. In a mold and trimmer, an upper and lower plate, a movable plate therebetween, provided with suitable mold openings, clearance between the upper and lower plate being sufficient to allow suitable movement of the movable plate, a cutting edge connected with the upper plate, means for moving the movable plate beyond the cutting edge, consisting of a cam actuated device.

5. In a mold and trimmer, an upper and lower plate, a movable plate therebetween provided with suitable mold openings, clearance between the upper and lower plate being sufficient to allow suitable movement of the movable plate, a cutting edge connected with the upper plate, means for moving the movable plate beyond the cutting edge, consisting of a cam actuated device, and yielding means for loosening the upper plate from its operative position.

6. A mold comprising a plate having a molding aperture therethrough, complemental members mounted a fixed distance apart from each other on opposite sides of said plate, each adapted to fit with close sliding fit in said aperture, and means for relatively moving said plate and members without rotation to cause one member to enter said aperture and the other to slide out of it to cut off material extruded from the mold.

7. In a mold and trimmer, a base plate, a top plate mounted on said base plate at a fixed distance therefrom, a molding member between said plates and cam mechanism rotatable on said base plate and engaging said member to move it from either plate to the other.

8. In a mold and trimmer, a base plate, a top plate mounted on said base plate at a fixed distance therefrom, guides connecting said plates, a molding member slidably mounted on said guides, and cam mechanism rotatable on said base plate and engaging said member to reciprocate it on said guides.

9. In molding apparatus, a base, a top plate spaced from and supported by said base, a molding plate reciprocable rectilinearly between said base and top plate, a plurality of shafts mounted in said base, cams fixed on each of said shafts and in contact with one face of said molding plate, and means connecting said shafts to rotate all by and in synchronism with the rotation of any of them.

10. The combination set forth in claim 9, in which said means include a parallel linkage connecting each shaft with all the other shafts.

In testimony whereof I affix my signature.

JOSEPH M. ANDRE.